US012657795B2

(12) United States Patent
Karuppasamy et al.

(10) Patent No.: US 12,657,795 B2
(45) Date of Patent: Jun. 16, 2026

(54) METHOD AND SYSTEM FOR IMAGE CONVERSION

(71) Applicant: Accenture Global Solutions Limited, Dublin (IE)

(72) Inventors: Selvakuberan Karuppasamy, Chennai (IN); Vinu Varghese, Bangalore (IN); Milind Pandurang Kharat, Mumbai (IN); Sunil Kumar Bm, Bangalore (IN); Nirav Jagdish Sampat, Mumbai (IN); Saran Prasad, New Delhi (IN); Nilanjana Pradhan, Pune (IN)

(73) Assignee: Accenture Global Solutions Limited, Dublin (IE)

( * ) Notice: Subject to any disclaimer, the term of this patent is extended or adjusted under 35 U.S.C. 154(b) by 162 days.

(21) Appl. No.: 18/819,852

(22) Filed: Aug. 29, 2024

(65) Prior Publication Data

US 2026/0065546 A1 Mar. 5, 2026

(51) Int. Cl.
G06T 11/60 (2026.01)
G06T 3/40 (2006.01)
(Continued)

(52) U.S. Cl.
CPC ............... G06T 11/60 (2013.01); G06T 3/40 (2013.01); G06T 5/70 (2024.01); G06T 5/77 (2024.01);
(Continued)

(58) Field of Classification Search
None
See application file for complete search history.

(56) References Cited

U.S. PATENT DOCUMENTS

| | | | | |
|---|---|---|---|---|
| 4,777,651 | A | * 10/1988 | McCann | .............. G06V 10/469 382/242 |
| 2019/0355154 | A1* | 11/2019 | Batra | ....................... G06T 11/10 |
| 2025/0139853 | A1* | 5/2025 | Su | ........................... G06F 30/10 |

FOREIGN PATENT DOCUMENTS

| | | |
|---|---|---|
| CN | 110992252 A | 4/2020 |
| WO | 2021051996 A1 | 3/2021 |

OTHER PUBLICATIONS

Safa Riyadh Waheed, et al., "CNN deep learning-based image to vector depiction," Multimedia Tools and Applications; Dordrecht vol. 82, Iss. 13, (May 2023): 20283-20302.(abstract 1 page) DOI:10. 1007/s11042-023-14434-w.

(Continued)

*Primary Examiner* — Robert J Craddock
(74) *Attorney, Agent, or Firm* — Seed Intellectual Property Law Group LLP

(57) ABSTRACT

Method, system, and computer-readable storage media for image conversion. A first image in a raster format is pre-processed to form a second image. Further, the second image is converted into grayscale to create a third image. Furthermore, the third image is denoised and smoothened to create a fourth image. A fifth image is created based on the fourth image by at least adding borders to objects in the third image. Further, a layering of the objects is first determined within the fifth image. Also, the objects in the fifth image are highlighted to create a sixth image. A graph schema is generated based on the fifth and/or sixth image. Based on the graph schema, edges of the objects within the sixth image are identified. Further, the sixth image is ungrouped based on the identified edges of the objects, the ungrouping generates an individual vector image for each of the objects.

20 Claims, 17 Drawing Sheets

(51) Int. Cl.
   *G06T 5/70*       (2024.01)
   *G06T 5/77*       (2024.01)
   *G06T 5/90*       (2024.01)
   *G06T 7/13*       (2017.01)

(52) U.S. Cl.
   CPC ................. *G06T 5/90* (2024.01); *G06T 7/13* (2017.01); *G06T 2207/20192* (2013.01)

(56)             References Cited

OTHER PUBLICATIONS

Yu-Jie Chen, et al., "Vector Quantized Image-to-Image Translation," (retrieved [arXiv:2207.13286v1 [cs.CV] Jul. 27, 2022]) 17 pages.

Chang Li, et al., "An Image-Pyramid-Based Raster-to-Vector Conversion (IPBRTVC) Framework for Consecutive-Scale Cartography and Synchronized Generalization of Classic Objects," Photogrammetric Engineering & Remote Sensing, Mar. 2019, vol. 85, No. 3, pp. 169-178, (10 pages).

* cited by examiner

402

404

406

408

410

412

414

416

418

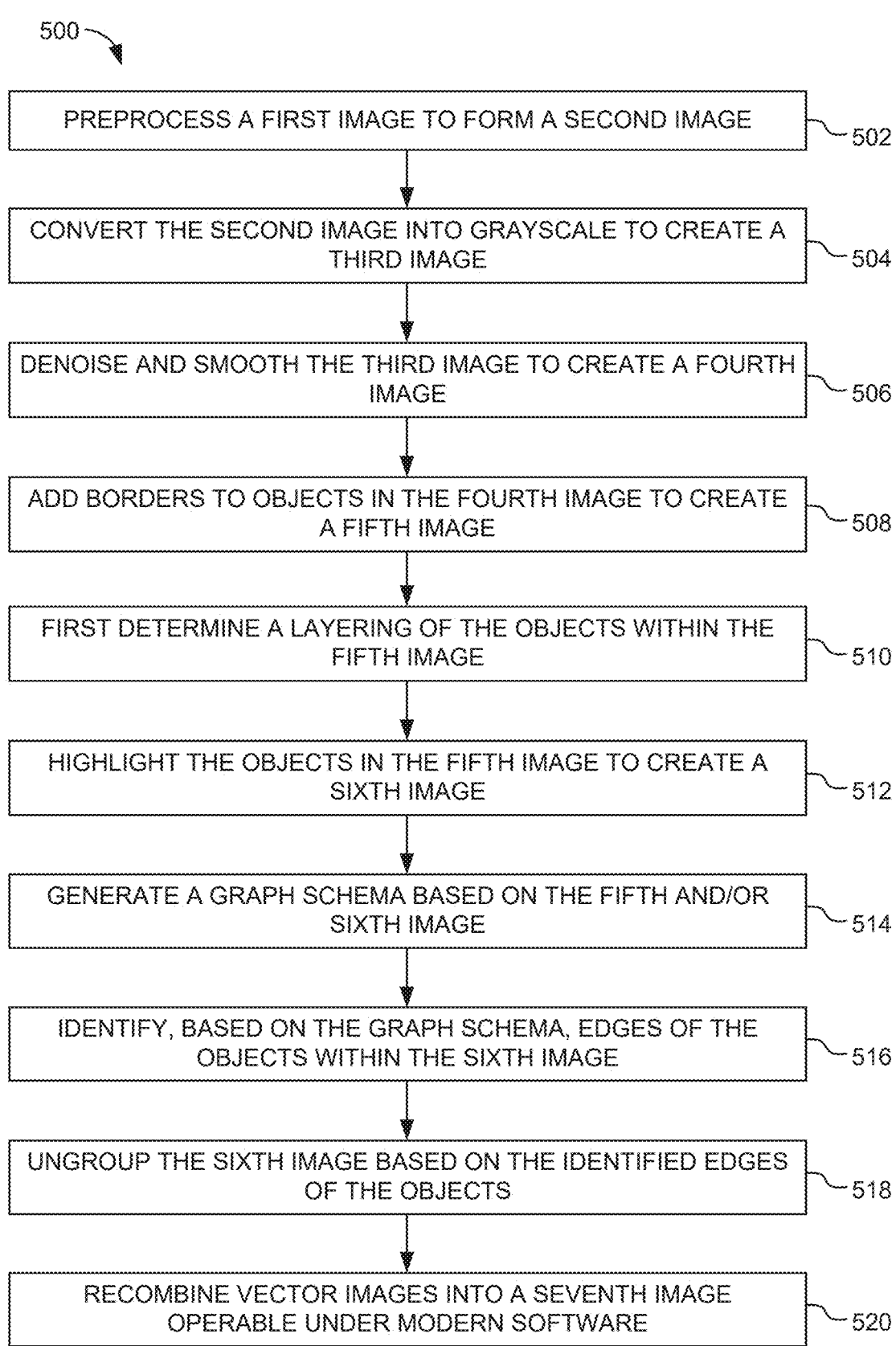

500

PREPROCESS A FIRST IMAGE TO FORM A SECOND IMAGE — 502

CONVERT THE SECOND IMAGE INTO GRAYSCALE TO CREATE A THIRD IMAGE — 504

DENOISE AND SMOOTH THE THIRD IMAGE TO CREATE A FOURTH IMAGE — 506

ADD BORDERS TO OBJECTS IN THE FOURTH IMAGE TO CREATE A FIFTH IMAGE — 508

FIRST DETERMINE A LAYERING OF THE OBJECTS WITHIN THE FIFTH IMAGE — 510

HIGHLIGHT THE OBJECTS IN THE FIFTH IMAGE TO CREATE A SIXTH IMAGE — 512

GENERATE A GRAPH SCHEMA BASED ON THE FIFTH AND/OR SIXTH IMAGE — 514

IDENTIFY, BASED ON THE GRAPH SCHEMA, EDGES OF THE OBJECTS WITHIN THE SIXTH IMAGE — 516

UNGROUP THE SIXTH IMAGE BASED ON THE IDENTIFIED EDGES OF THE OBJECTS — 518

RECOMBINE VECTOR IMAGES INTO A SEVENTH IMAGE OPERABLE UNDER MODERN SOFTWARE — 520

FIG. 5

METHOD AND SYSTEM FOR IMAGE CONVERSION

TECHNICAL FIELD

Various embodiments described herein relate generally to computer-implemented method and computer system for converting raster images into vector images.

BACKGROUND

Technical publications are commonly used by Original Equipment Manufacturers (OEMs) to disclose engineering details/technical details of products. The technical publications include, for example, operator's manuals, service manuals, parts manuals, service bulletins, kit instructions, and/or the like. Further, the technical publications use technical illustrations or graphics, or artworks to disclose the engineering details/technical details of the products. Therefore, effective Reusability of Information (ROI) is required for developing the technical publications.

The technical publications published by the OEMs especially in the field of aerospace and automotives include a huge volume of technical illustrations, which are in a form of raster images. The raster images are not reusable, as the raster images are in a non-editable format. Therefore, new images are required to be created from the raster images or the raster images are required to be revised. In some examples, the new images are created using 3D Computer-aided design (CAD) models. If the 3D CAD models are not available, then the new images are created by manually tracing the raster images. However, tracing the raster images manually are expensive and consumes more time. In addition, quality of the new images resultant from tracing the raster images may not be satisfactory. To avoid such a manual tracing, the raster images can be converted into vector images, which can be further used to understand the technical details.

SUMMARY

Implementations of the present disclosure are generally directed to conversion of raster images into vector images by increasing several objects in an original raster image that can be located for conversion to vector images and improving a quality of the resulting vector images.

In general, innovative aspects of the subject matter described in this specification provide a computer-implemented method for generating vector images of objects within a first image in a raster format. The method includes preprocessing the first image to form a second image. Further, the method includes converting the second image into grayscale to create a third image. The method includes denoising and smoothing the third image to create a fourth image. Furthermore, the method includes creating a fifth image based on the fourth image by at least adding borders to the objects in the third image. The method includes first determining a layering of the objects within the fifth image. Also, the method includes highlighting the objects in the fifth image to create a sixth image. Based on the fifth and/or sixth image, the method includes generating a graph schema, the graph schema representing the objects, relationships between individual ones of the objects, and context of use of the objects. The method includes identifying, based on the graph schema, edges of the objects within the sixth image. Based on the identified edges of the objects, the method includes ungrouping the sixth image, the ungrouping generates an individual vector image for each of the objects.

The present disclosure further describes a system for implementing the method provided herein. The present disclosure also describes computer-readable storage media coupled to one or more processors and having instructions stored thereon which, when executed by the one or more processors, cause the one or more processors to perform operations in accordance with the method described herein.

It is appreciated that methods in accordance with the present disclosure can include any combination of the aspects and features described herein. That is, the method in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF THE FIGURES

Various embodiments in accordance with the present disclosure will be described with reference to the drawings, in which:

FIG. 5 is a flow diagram that presents an example computer-implemented method for generating vector images of objects within a first image in a raster format in accordance with implementations of the present disclosure.

Like reference numbers and designations in the various drawings indicate like elements.

DETAILED DESCRIPTION

Figure 1:
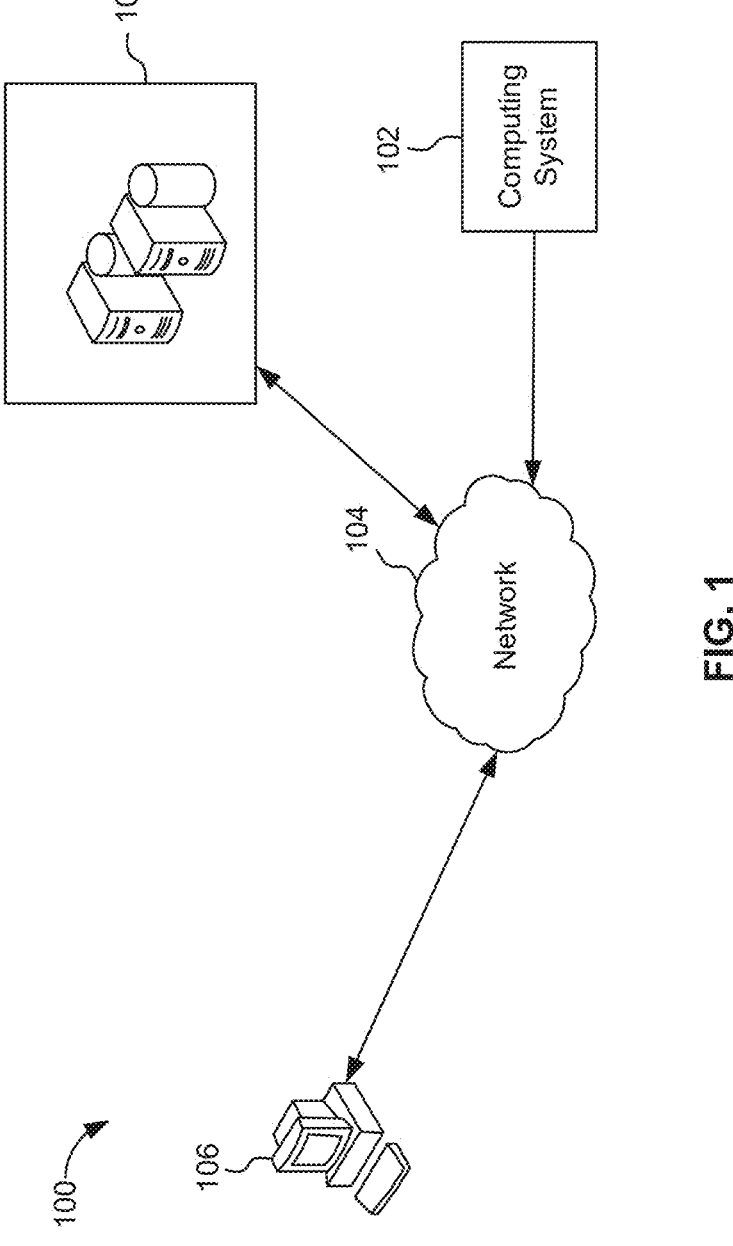
FIG. 1 depicts an example environment that may be used to execute implementations of the present disclosure.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope of the claimed subject matter.

Reference to any "example" (e.g., "for example", "an example of", by way of example" or the like) are to be considered non-limiting examples regardless of whether expressly stated or not.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

The term "comprising" when utilized means "including, but not necessarily limited to"; it specifically indicates open-ended inclusion or membership in the so-described combination, group, series and the like.

The term "a" means "one or more" unless the context clearly indicates a single element.

"First," "second," etc., are labels to distinguish components or blocks of otherwise similar names but does not imply any sequence or numerical limitation.

"And/or" for two possibilities means either or both stated possibilities ("A and/or B" covers A alone, B alone, or both A and B take together), and when present with three or more stated possibilities means any individual possibility alone, all possibilities taken together, or some combination of possibilities that is less than all of the possibilities. The language in the format "at least one of A . . . and N" where A through N are possibilities means "and/or" for the stated possibilities (e.g., at least one A, at least one N, at least one A and at least one N, etc.).

It should also be noted that in some alternative implementations, the functions/acts noted may occur out of the order noted in the figures. For example, two steps disclosed or shown in succession may in fact be executed substantially concurrently or may sometimes be executed in the reverse order, depending upon the functionality/acts involved.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures, and techniques may be shown without unnecessary detail in order to avoid obscuring example embodiments.

The specification and drawings are to be regarded in an illustrative rather than a restrictive sense. It will, however, be evident that various modifications and changes may be made thereunto without departing from the broader spirit and scope of the invention as set forth in the claims.

This disclosure should be interpreted according to the exemplary definitions provided below. In case of a contradiction between the definitions in the definitions section and other sections of this disclosure, this section should prevail. In case of a contradiction between the definitions in this section and a definition or a description in any other document, including in another document incorporated in this disclosure by reference, this section should prevail, even if the definition or the description in the other document is commonly accepted by a person of ordinary skill in the art.

"Layer" or the like refers to an overlap between objects caused by some objects being in front of or behind other objects in the image. When objects overlap, determining "layering" or the like of an object refers to determining if the object is in front of or behind other overlapping objects in the image.

"Ungroup" or the like refers to a software function in drafting programs that converts a collective image of objects that are moved/saved/manipulated as a group into the individual component objects that can be individually moved/saved/manipulated.

Many older technical manuals include technical images/illustrations of interest that current users would like to manipulate with modern software functions, such as exploding the objects within the image or zooming into specific objects in the image. However, due to age, the original computer files of the technical manuals are no longer available or in a file format that modern software cannot manipulate in the desired manner. This has forced line engineers to manually recreate the technical image from scratch using modern drafting software, with corresponding cost, time and accuracy issues.

To avoid extensive human recreation of technical images, traditional methods use computerized attempts to convert older technical images by converting the raster image to grayscale; binarizing the grayscale image using a threshold; finding contours in the binary image; creating an empty black image as canvas; drawing contours on vector image and saving/displaying the vector image.

The traditional methods for generating vector images of objects within a raster image have technical problems in either an inability to identify objects in the raster image in the first place or the resulting vector image having poor quality. This is because the traditional methods are sensitive to noise, the edge detection is not accurate, and differentiating object boundaries from texture or shadow edges is challenging as both can have similar gradient profiles. As a result, traditional methods could not be able to identify some objects at all within the raster image at all, and many objects that are detected result in corresponding vector images that are blurry or distorted. Human recreation by hand remains necessary to supplement failings of the traditional methods.

Further, processing of the generated vector images of the objects within the raster image is difficult as the vector images include insufficient information. The traditional methods may use deep learning models for processing of the vector images. However, results of the processing the vector images are not satisfactory as the deep learning models are very sensitive to noise, edge detection is not accurate in the vector images and due to challenges in object and edge detection.

Implementations of the present disclosure provide an efficient Image Transformation (IMT) framework for reusing raster/non-editable images for future creation/revision tasks. The IMT framework leverages uses of feature learning models to learn features, which can be generalized across the various raster image types. Further, the IMT framework leverages use of nested profiling knowledge graph models to obtain better edges even when a resolution of the raster images is low.

FIG. 1 depicts an example environment 100 that may be used to execute implementations of the present disclosure. In some examples, the example environment 100 manages conversion of images.

As depicted in FIG. 1, the example environment 100 includes one or more computing systems 102, a network 104, one or more computing devices 106 and one or more databases 108. The computing system 102 and the computing device 106 may communicate with each other using the network 104. In some examples, the network 104 may include a Local Area Network (LAN), a Wide Area Network (WAN), the Internet, or a combination thereof. In some examples, the network 104 may be accessed over a wired and/or a wireless communication link. Further, the computing system 102 and the database 108 and may communicate with each other using the network 104. The database 108 may be used to store images for conversion. The images may be unstructured and in a raster format. The images may be fetched from different technical publications/documents that are stored in different data sources. The database 108 may be used to store information generated during the image conversion process.

In some examples, the computing device 106 may be used by a respective user to log into and interact with computing platforms executing image conversion applications. Examples of the computing device 106 may include a desktop computing device, a smartphone, a laptop, tablet, a voice-enabled device, and/or the like. It is contemplated that implementations of the present disclosure may be realized with any appropriate type of computing device. Examples of the computing platforms may include content delivery platforms, multimedia-based platforms, and/or the like. In some examples, the computing device 106 may display one or more Graphical User Interfaces (GUIs) that enable the user to interact with the computing platform executing the image generation applications. Interacting with the computing platform may include identifying the raster images to be converted into vector images.

In some examples, the computing system 102 may be implemented as an on-premises system that is operated by an enterprise or a third-party engaged in cross-platform interactions and image generation management. In some examples, the computing system 102 may be implemented as an off-premises system (for example, cloud or on-demand) that is operated by an enterprise or a third-party on behalf of an enterprise. In some examples, the computing system 102 may be implemented in a cloud environment. For simplicity, the computing system 102 depicted in FIG. 1 may be a cloud environment that is intended to represent various forms of servers including a web server, an application server, a proxy server, a network server, a server pool, and/or the like.

In some examples, the computing system 102 hosts the image conversion applications, which may be executed on the computing platforms (with which the user of the computing device 106 can interact for generation of the images). The image conversion applications may provide image conversion functions or services.

In accordance with implementations of the present disclosure, the computing system 102 generate vector images of objects within each of the images in the raster format, thereby converting each of the images in the raster format into the vector images. Various examples of converting the images are described in detail in conjunction with FIGS. 2-7.

Figure 2:
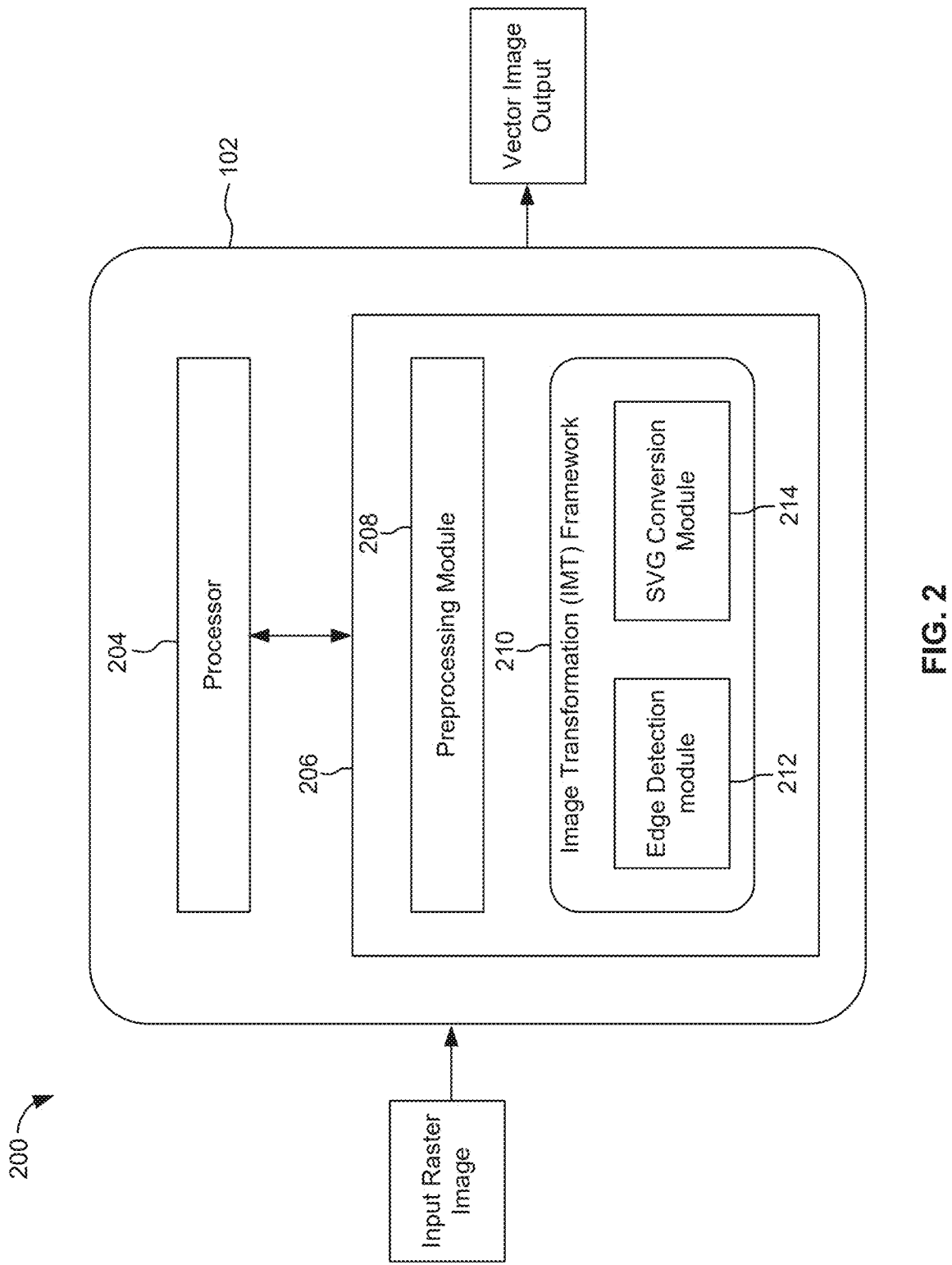
FIG. 2 depicts an example architecture of a computing system for generating vector images from raster images in accordance with implementations of the present disclosure.

FIG. 2 depicts an example architecture 200 of the computing system 102 for generating the vector images from the raster images in accordance with implementations of the present disclosure. Referring to FIG. 2, the computing system 102 includes one or more processors 204, and a memory 206. The computing system 102 may also include other components such as communication interfaces, Input/Output (I/O) devices, and so on (not shown in FIG. 2).

In some examples, the processor 204 may include, but not limited to, microprocessors, microcomputers, hardware processors, microcontrollers, digital signal processors, central processing units, state machines, logic circuits, Application Specific Integrated Circuits (ASICs), Field Programmable Gate Arrays (FPGAs), and/or any devices that manipulate data or signals based on operational instructions. Among other capabilities, the processor 204 may be programmed to cooperate with computer-readable instructions stored in the memory 206 (also referred to be as computer-readable medium) for performing operations according to the present disclosure. The memory 206 may be non-transitory or non-volatile medium, such as a magnetic disk or solid-state non-volatile memory or volatile medium such as Random Access Memory (RAM), and/or the like.

The computing system 102 further includes a preprocessing module 208 and an image transformation (IMT) framework 210, as depicted in FIG. 2. The preprocessing module 208 and the IMT framework 210 may be stored in the memory 206 and provided as a downloadable library including the computer-readable instructions. The preprocessing module 208 and the IMT framework 210 may be executed on the processor 204 for conversion of the raster or unstructured images. Further, the IMT framework 210 includes an edge detection module 212 and a scalable vector graphics (SVG) conversion module 214. In some implementations, the edge detection module 212 may leverage multiple customized logics for performing its intended functions. In some examples, feature learning models, nested profiling knowledge graphs models may include Generative Artificial Intelligence (Gen AI) models, Deep Learning (DL) models, deep neural networks, and/or the like.

In some examples, the preprocessing module 208 may be programmed or otherwise configured to receive a first image in a raster format or any unstructured image and preprocess the first image to form a second image. For example, the first image in the raster format, also known as a raster image, is a type of digital image composed of a grid of individual pixels, each with its own color and intensity. Also, the raster image is constrained to a given resolution. The raster image can be, for example, a sketch, a photograph, a video frame, a scanned document such as a bitmap, or any other type of raster image. It should be noted that terms "first image" and "raster image" are used interchangeably throughout the document.

In some examples, the preprocessing module 208 may be programmed or otherwise configured to preprocess the first/raster image to form a second image. The second image may be a preprocessed form of the first image. The preprocessing module 208 may preprocess the first image by performing, for example, image resizing, image normalization, brightness and contrast adjustment of the image, noise reduction within the image, edge enhancement, and/or by applying any appropriate pre-processing techniques on the first image.

In some examples, the preprocessing module 208 may identify a resolution of the received input raster image and may perform the image resizing if the resolution of the image is less than 300 dots per inch (DPI). The preprocessing module 208 may further increase the resolution of the raster image to generate a high-quality image. For example, the resolution may be increased such that the resolution of the raster image is greater than 300 DPI.

In some examples, the preprocessing module 208 may normalize the raster image when the raster image includes multiple overlapping pixels. The preprocessing module 208 may further adjust pixel values of the overlapping pixels to produce a coherent image and identify a part in the raster image to which the overlapping pixels belongs.

In some examples, the preprocessing module 208 may reduce or remove unwanted noise from the raster image. For example, noise in an image may be resultant from various sources, such as sensor limitations, compression artifacts, or environmental factors. The preprocessing module 208 may reduce or remove unwanted noise from the raster image, for example, to improve image quality and clarity for analysis, interpretation, and visual appeal.

In some examples, the preprocessing module 208 may perform the brightness and contrast adjustment/enhancement on the raster image by adjusting visual characteristics of the raster image to make the raster image clearer, vibrant, and aesthetically pleasing. The brightness and contrast adjustment/enhancement may make features (e.g., color, texture, and shape features) in the raster image more distinct, enhance details, and improve overall image clarity of the raster image.

In some examples, the preprocessing module 208 may perform the edge enhancement to make edges and boundaries within the raster image more distinct, which can help in highlighting important features, improving clarity, and making details more visible. The preprocessing module 208 may perform the edge enhancement, for example, by increasing contrast around one or more of the edges and boundaries in the raster image, making them prominent and easier to distinguish from surrounding areas.

The edge detection module 212 is programmed or otherwise configured to receive the second image, for example, the preprocessed image and convert the preprocessed image into a third image, for example, a gray scale image. The edge detection module 212 may further generate a fourth image by reducing noise in the third/gray scale image and highlighting individual components in the third/gray scale image. Upon creating the fourth image, the edge detection module 212 may create a fifth image based on the fourth image by adding borders to the objects (e.g., entities, subjects, and/or the like) in the third image. Once the fifth image is created, the edge detection module 212 may determine a layering of the objects within the fifth image and highlight the objects in the fifth image to create a sixth image. Further, the edge detection module 212 may generate a graph schema based on the fifth/sixth image. The graph schema may represent the objects, relationships between individual ones of the objects, and a context of use of the objects. For example, the above steps performed by the edge detection module 212 are explained in detail with reference to FIG. 3.

Figure 3:
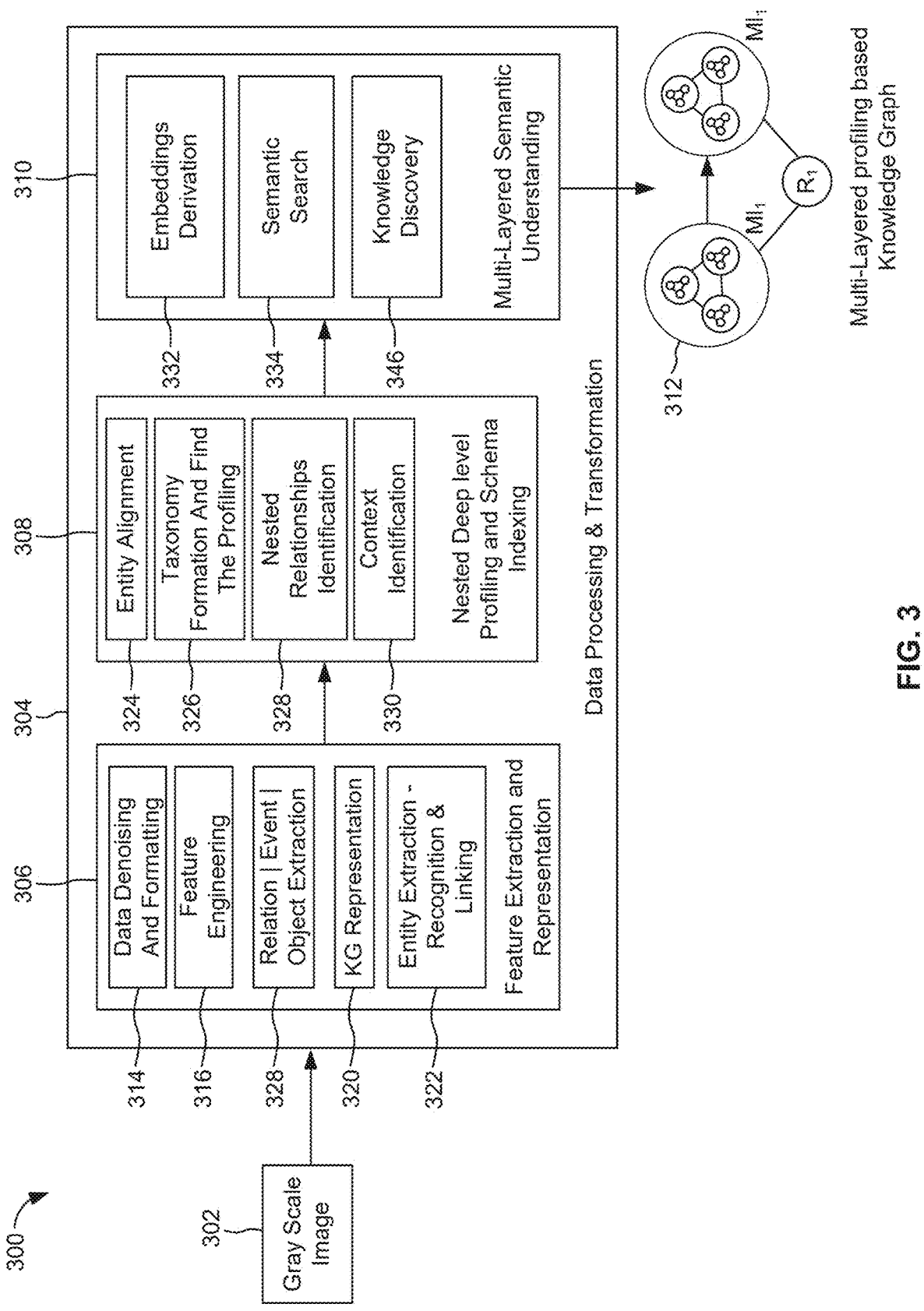
FIG. 3 depicts a schematic diagram detailing sequential steps executed by an edge detection module of FIG. 2 in accordance with implementations of the present disclosure.
Figure 4A:
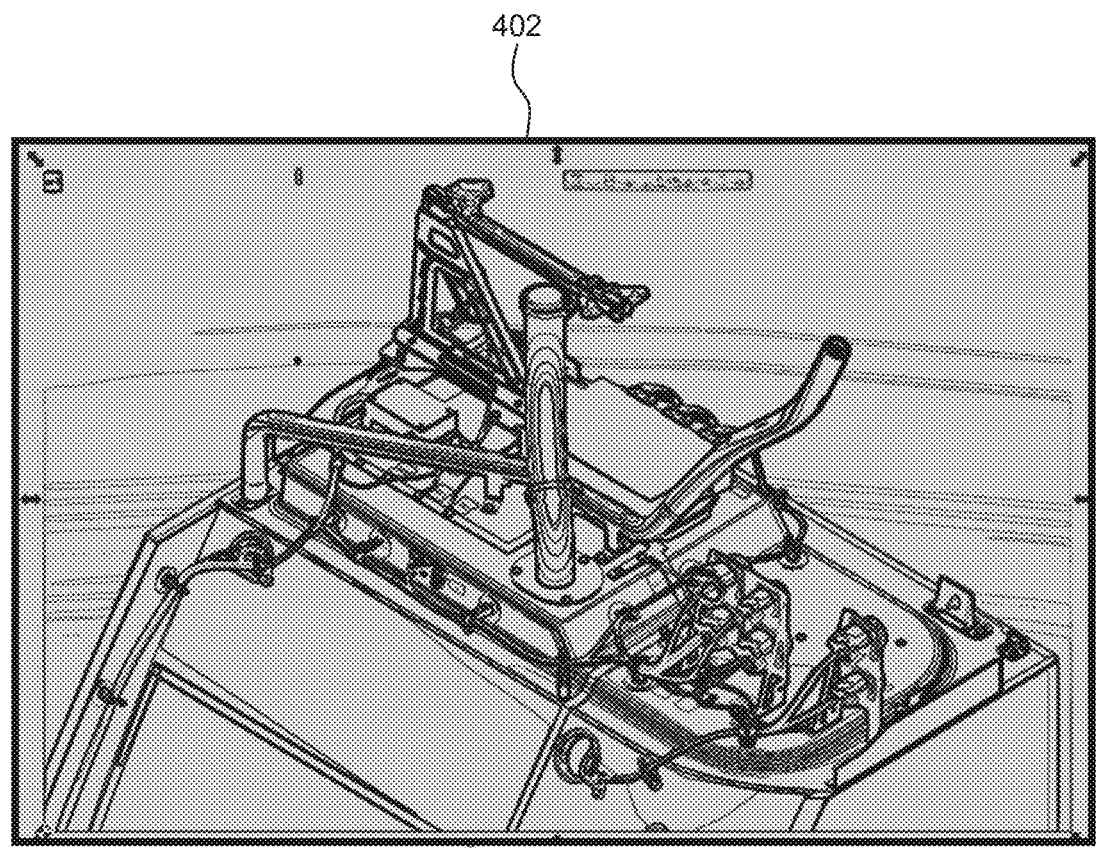
FIGS. 4A-4K depict various images generated during detection of edges in a raster image in accordance with implementations of the present disclosure.

Referring now to FIG. 3, a schematic diagram 300 detailing sequential steps executed by the edge detection module 212 is illustrated. The edge detection module 212 receives the third image/gray scale image 302. An example image 402 illustrated in FIG. 4A depicts the third image/gray scale image 302. Upon receiving the third image 302, the edge detection module 212 performs data processing and transformation 304 on the third image 302. The data processing and transformation 304 involves feature extraction and representation 306, nested deep level profiling and schema indexing 308, and multi-layered semantic understanding 310.

The feature extraction and representation 306 may involve denoising, smoothing and formatting 314, feature engineering 316, relation, event, and object extraction 318, Knowledge Graph (KG) representation 320, and entity extraction, recognition, and linking 322, which are described in detail below.

Figure 4B:
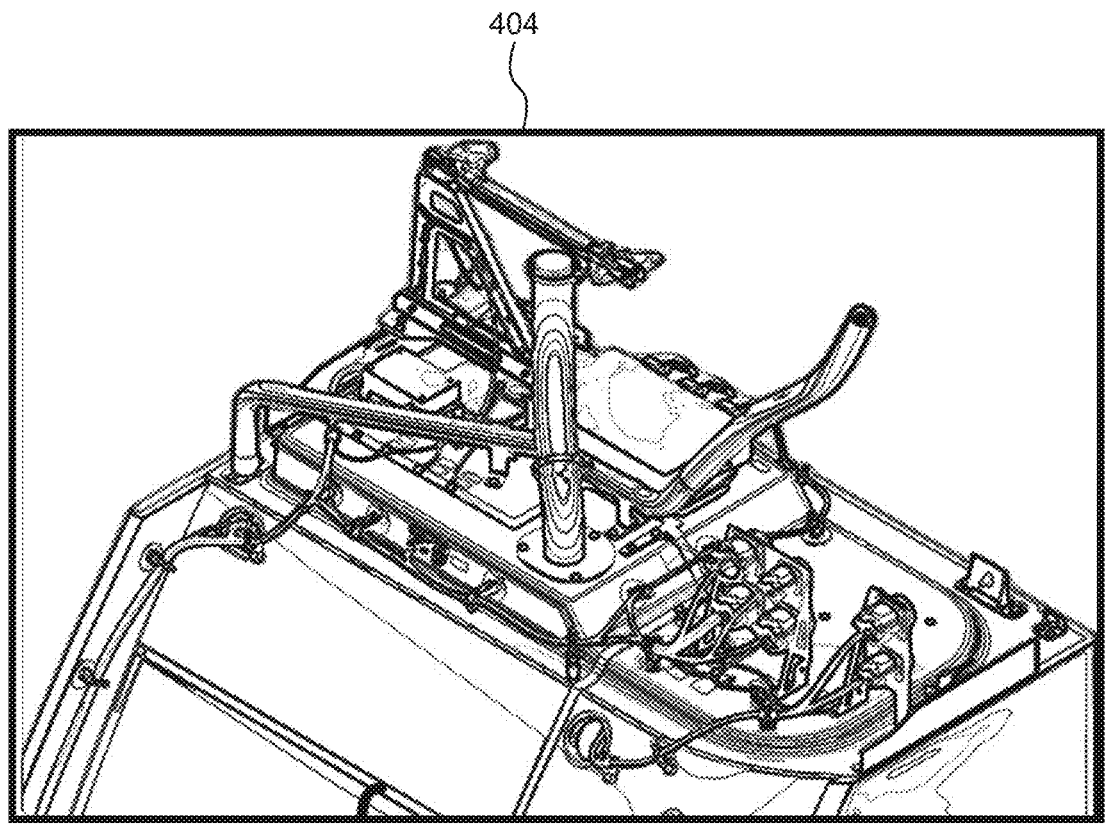

The edge detection module 212 creates the fourth image by performing the denoising, smoothing and formatting 314 on the third image 302, in accordance with a pixel-by-pixel basis. In some examples, the denoising and smoothing may be performed by replacing each pixel with a median value of a neighboring pixel. After the replacing, salt and pepper noise and gaussian noise may be removed in the third image 302. Further, filters may be applied to smooth the third image 302. Upon smoothing the third image 302, the fourth image may be created by changing format of the third image 302 by considering both spatial closeness and pixel intensity similarity. An example image 404 (e.g., denoised image) illustrated in FIG. 4B depicts the fourth image.

Figure 4C:
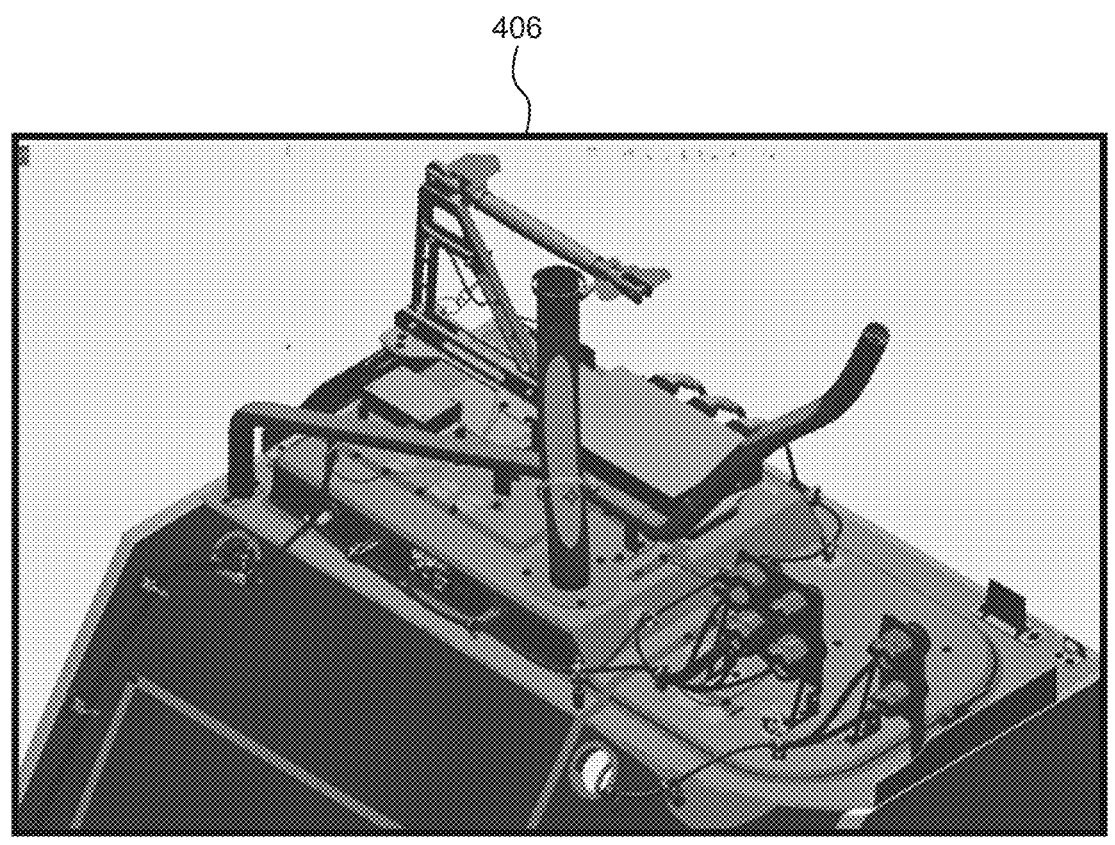
Figure 4D:
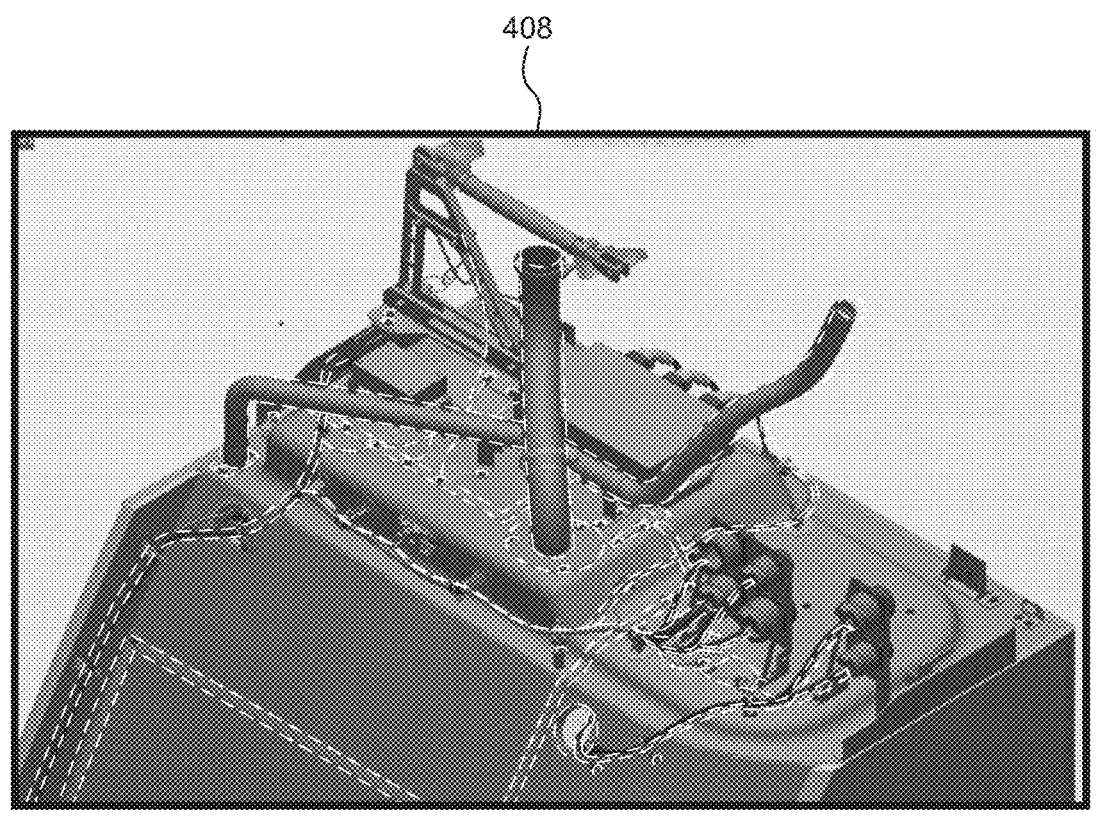

The edge detection module 212 further creates the fifth image from the fourth image and performs the feature engineering 316 to extract a set of features from the fifth image. An example image 406 illustrated in FIG. 4C depicts the fifth image. For example, for creating the fifth image, dimensions of the fourth image may be adjusted to a fixed size required by the application. Further, pixel values in the fourth image may be scaled to a specific range (e.g., 0-1 or −1 to 1). Upon scaling the pixel values, borders are added to objects of the third image based on the fourth image to achieve a desired size or aspect ratio. For example, the objects in the fourth image 404 (depicted in FIG. 4B) may include a hose, a wall and a pipe. The fifth image may be then created by changing a color space of the fourth image (e.g., RGB to grayscale, HSV) after adding the borders. The set of features can be then extracted from the fifth image. For example, the set of features comprise color, texture, shape, image distortion, pixel density and the like.

Upon creating the fifth image, the edge detection module 212 performs the relation, event, and object extraction 318 to extract a relationship between the set of features, events and objects may for each of the features. In other words, physical connections between the objects within the fifth image may be identified. For example, relationship extraction may be performed as in an image 408 of FIG. 4D.

Figure 4E:
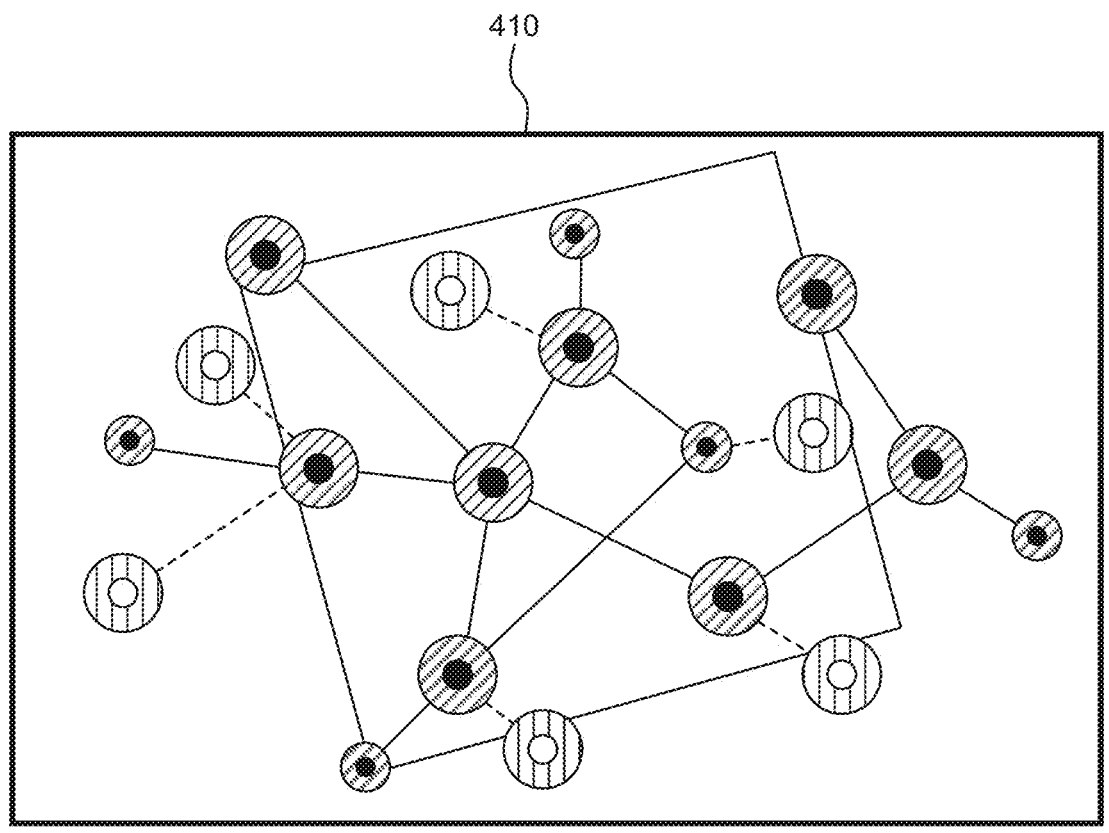
Figure 4F:
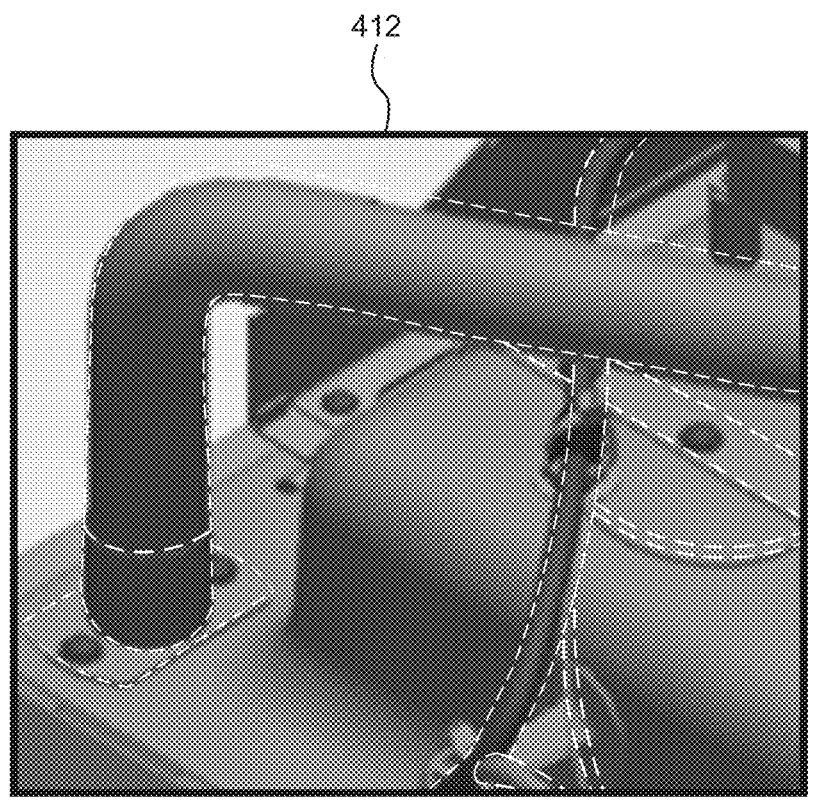

For each of the features, the edge detection module 212 performs the KG representation 320 to represent the associated relationships in the graph schema/knowledge graph, for example, an image 410 of FIG. 4E. Thereafter, the edge detection module 212 performs the entity extraction, recognition, and linking for creating the sixth image by highlighting the objects in the fifth object based on the associated features and its relationships and a layering of the objects determined within the fifth image. The sixth image may be illustrated as image 412 in FIG. 4F.

Upon generating the sixth image, the nested deep level profiling and schema indexing 308 may be performed on the sixth image based on the features, the objects, the knowledge graph and the relationships using the nested profiling knowledge graphs models. The nested deep level profiling and schema indexing 308 may involve entity alignment 324, taxonomy formation and find the profiling 326, nested relationships identification 328, and context identification 330, which are described in detail below.

The edge detection module 212 performs the entity alignment 324 for identifying and matching equivalent objects (also referred as entities) across different layers found in the fifth image. For each of the objects, a layer L1 and an edge e1 may be identified as connecting nodes in the knowledge graph. Further, the process of entity alignment checks for each Layer, how many entities represents the edge e1 in the knowledge graph. For example, for overlapping objects, the entity alignment 324 identifies physical connection between the objects and a degree of overlap of the objects. Further, the graph schema may be generated based on the fifth and/or sixth image. The graph schema represents the objects, relationships between individual ones of the objects, and context of use of the objects.

Once the graph schema is generated, the edge detection module 212 performs the taxonomy formation and find the profiling 326 to create nested relationship models from the graph schema in such a way that how the relationship within a particular object can be linked to other objects. The nested relationship models may be created by representing properties and relationships for a group of objects, creating a nested relationship i.e., common to the group of objects and creating the nested relationship models from the graph schema based on the nested relationship. Further, the knowledge graph can be updated with nested profiling to create a nested profiling knowledge graph.

Figure 4G:
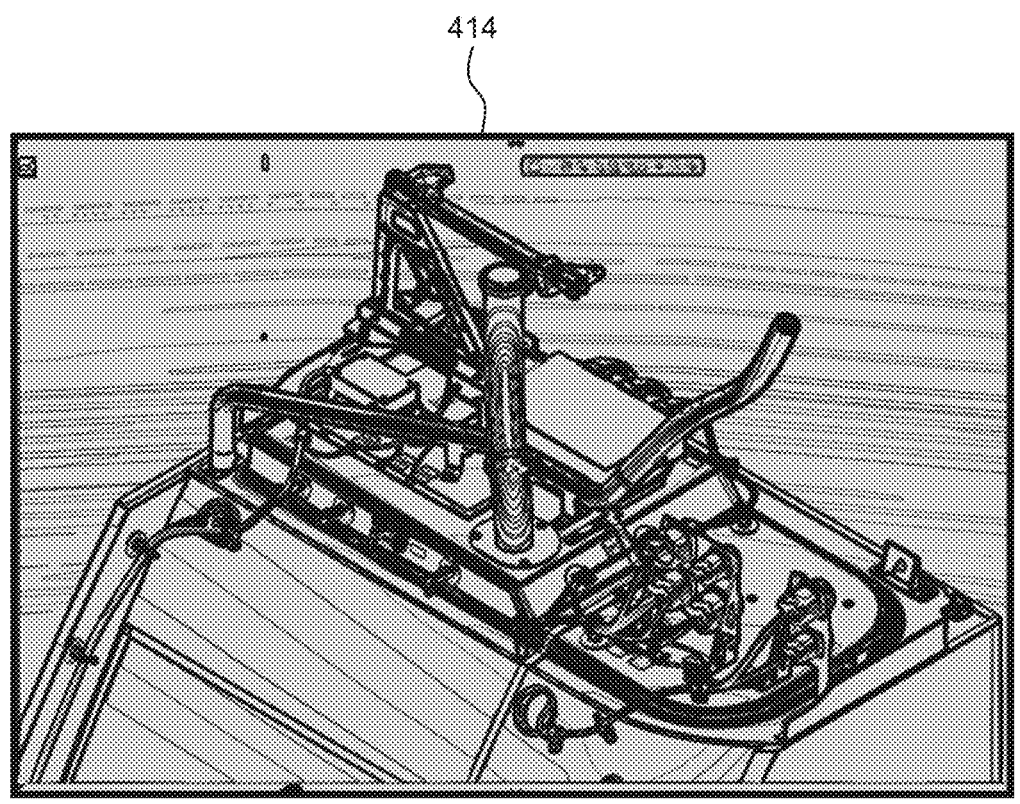
Figure 4H:
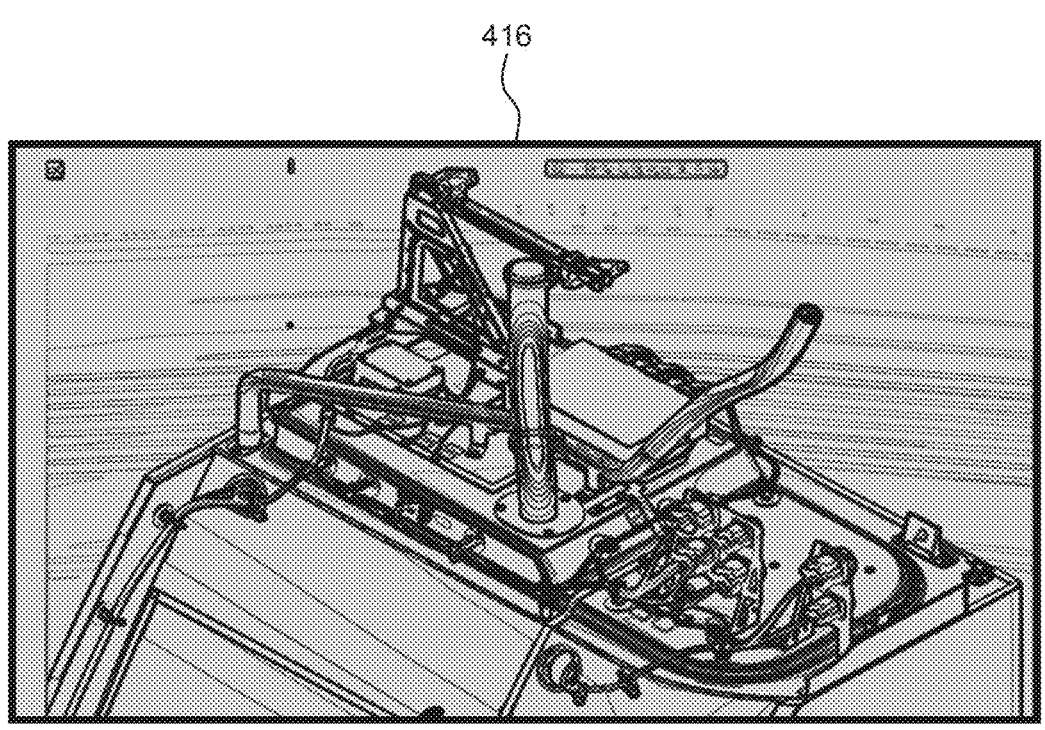

The edge detection module 212 further performs the nested relationships identification 328 to determine a nested profiling schema score for the objects based on the nested relationship models, for example objects in images 414 and 416 of FIGS. 4G-4H, respectively. In an embodiment, let N1, N2, N3 . . . Nn denotes the nodes for each object in the sixth image, let E1, E2, E3 . . . En denotes the edges in the knowledge graph, let P1, P2, P3 . . . Pn defines profiling scores based on the relationships, let GS1, GS2, G3 . . . GSn denotes the graph schema constructed. Further, a deep level network may be constructed based on the graph schema and a nested profiling schema score may be determined based on the nodes, edges, profiling scores and graph schema. For example, the nested profiling schema score (NPS) is a summation of $(n1*E1*P1*GS1+ \ldots nn*En*Pn*GSn)$.

Figure 4I:
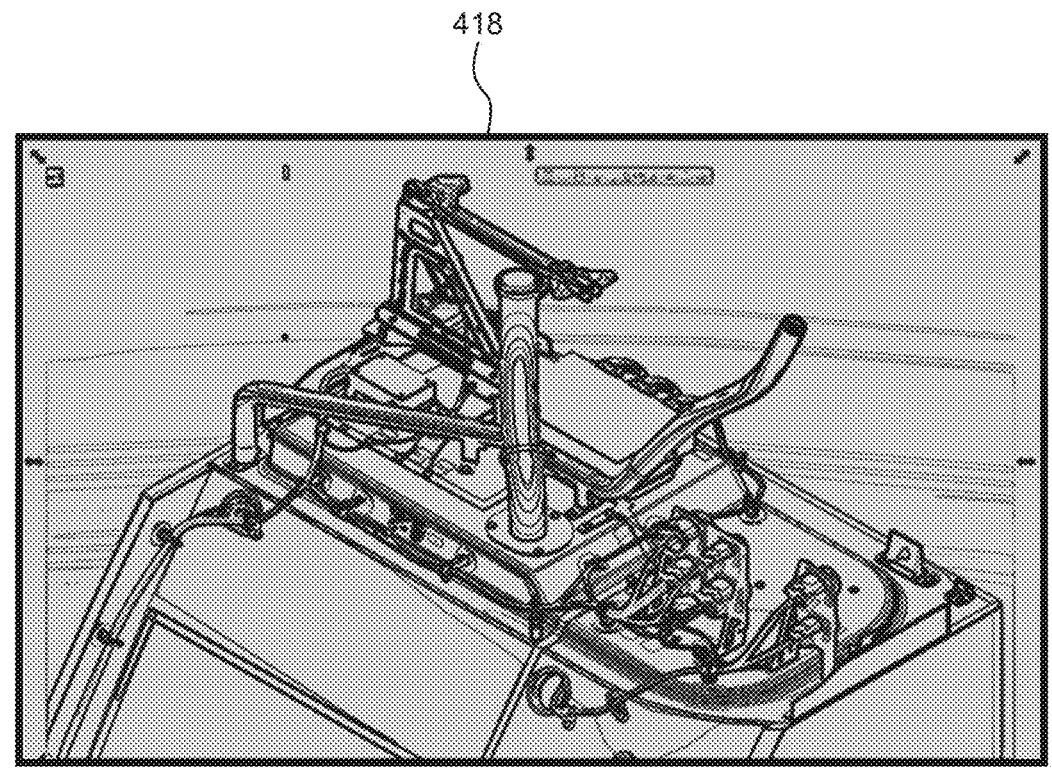

The edge detection module 212 further performs the context identification 330 to determine context of the objects based on a schema index, for example, as in an image 418 of FIG. 4I. For example, the nested profiling schema score is applied at multi-layers of the image 418 (depicted in FIG. 4I) for extracting the context of the objects. The nested profiling schema score at the multi-layers defines more context of the objects in the image. Then, each edge of the objects may be identified after extracting the context of the objects.

Based on the nested profiling knowledge graph, the nested profiling schema score and the context of the objects, the edge detection module 212 performs the multi-layered semantic understanding 310 of the context of the objects. The multi-layered semantic understanding 310 may involve embedding derivation 332, semantic search 334, and knowledge discovery 336, which are described in detail below.

Figure 4J:
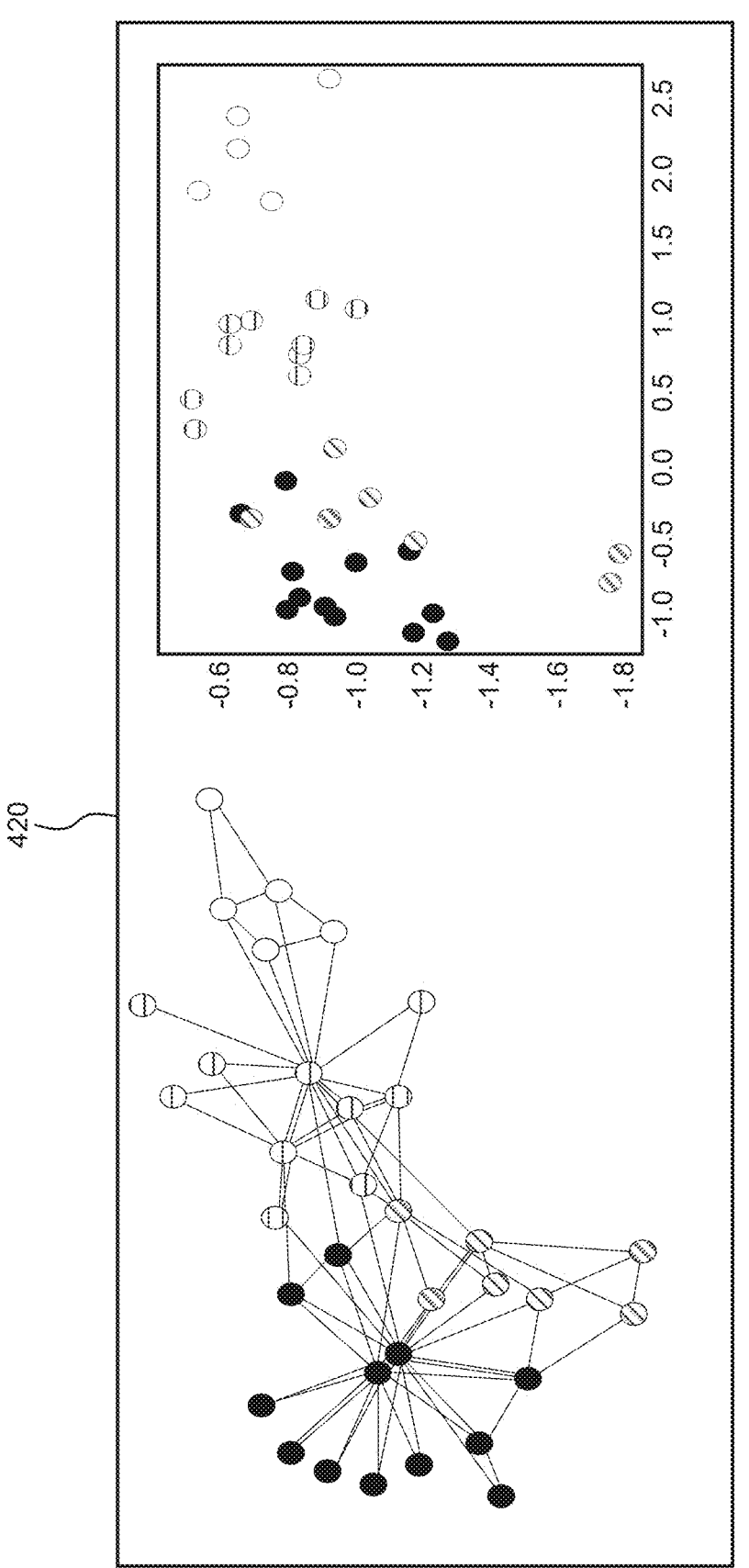

The edge detection module 212 performs the embedding derivation 332 to convert the nested profiling knowledge graph into knowledge graph embeddings where the nodes, edges, or entire nested profiling knowledge graph is represented in a continuous vector space, for example, as shown in an image 420 of FIG. 4J. Further, any change request related to the objects or edges or nodes during the process of the image conversion can also converted into embeddings. Then, meta data associated with the knowledge graph embeddings and the embeddings may be stored in a database (e.g., the database 108 of FIG. 1).

The edge detection module 212 further performs the semantic search 334 to match the knowledge graph embeddings and the embeddings against existing images. Further, context of the change request may be identified, and context of the objects may be identified based on the context of the change request. The context of the objects identified by considering the context of the change request may be compared against the context of the objects identified from the of nested profiling knowledge graph. Based on the comparison, final context of the objects may be identified, and the objects and edges may be retrieved as co-ordinates.

Figure 4K:
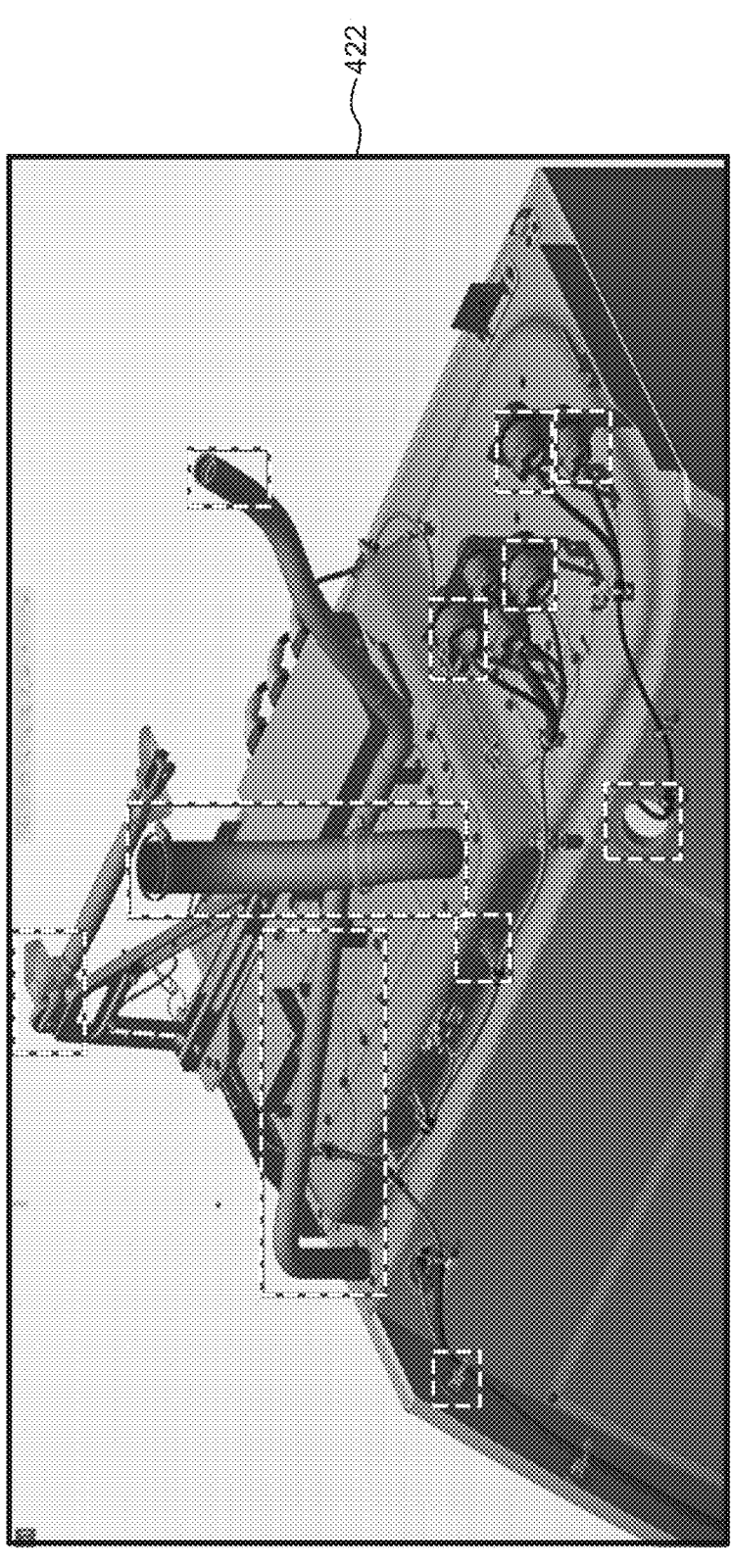

The edge detection module 212 further performs the knowledge discovery 336 to highlight each of the objects based on the final context of the objects, for example, as in an image 422 of FIG. 4K. Further, the edges are clearly identified and marked. Further, in an example, noise power spectrum is applied on the image 418 of FIG. 4I. The objects or edges can be easily replaceable or identifiable. For example, a multi-layered profiling-based knowledge graph 312 obtained from the multi-layered semantic understanding 310 is stored in the database (e.g., the database 108 of FIG. 1) for knowledge inference.

Referring back to FIG. 2, the SVG conversion module 214 may determine image attributes of the identified objects based on the graph schema. For example, the image attributes may include size of pipe, blurriness, scaling values, form blur/light color, overlapping objects, image distortion and the like.

Figure 6:
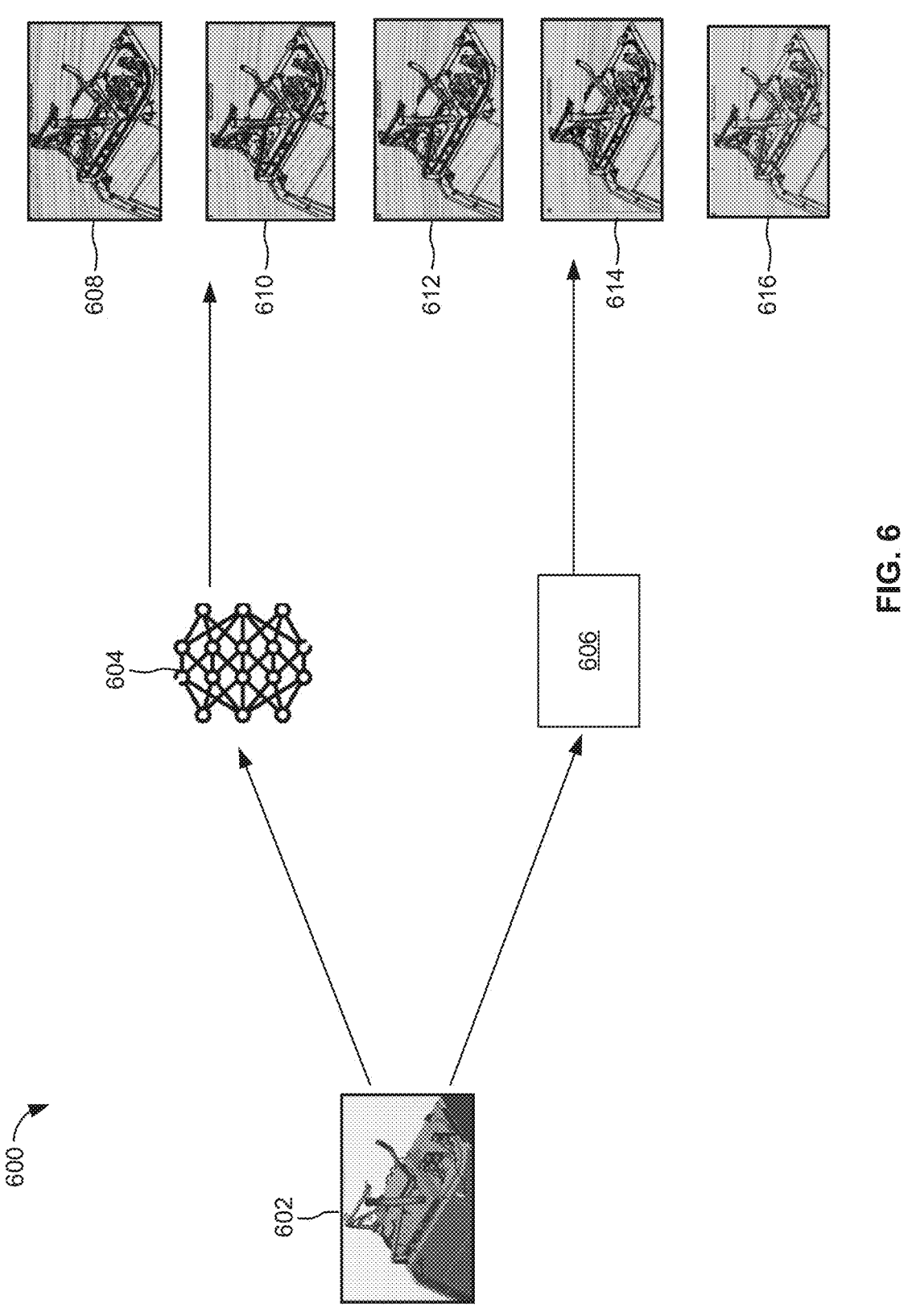
FIG. 6 depicts generation of multiple scan-traced images in accordance with implementations of the present disclosure.

Further, the SVG conversion module 214 may rank the image attributes based on the nested profiling schema score. For example, the SVG conversion module 214 may determine if the image attributes satisfy first predefined criteria. In response to a negative result, the SVG conversion module 214 may modify one or more of the image attributes of the objects and repeats the process of identifying if the modified image attributes satisfy first predefined criteria. If the images attributes satisfy first predefined criteria, the SVG conversion module 214 may generate the vector images of the objects in the raster image by ungrouping the sixth image based on the identified edges of the objects, thereby ungrouping may generate an individual vector image for each of the objects. The ungrouping of the sixth image by performed by generating multiple scan-traced images. For example, FIG. 6 depicts generation of multiple scan-traced images 608-616 of an input image 602 in accordance with implementations of the present disclosure. For example, the multiple scan-traced images 608-616 may include a 256 scan-traced image, a 200 scan-traced image, a 150 scan-traced image, a 100 scan-traced image and a 50 scan-traced image, respectively. The multiple scan-traced images 608-616, for example, generated using a pretrained model 604 and the proposed IMT framework 606 (analogous to the IMT framework 210).

FIG. 5 is a flow diagram that presents an example computer-implemented method 500 for image conversion, in accordance with implementations of the present disclosure. Particularly, the flow diagram that presents the example computer-implemented method 500 for generating vector images of objects within a first image in a raster format. In some implementations, the method 500 may be executed by the processor 204 of the computing system 102, as described in relation to FIGS. 2-4.

At step 502, the method 500 includes preprocessing the first image to form a second image. In some embodiments, preprocessing the first image may include any of resizing the first image, normalizing the first image, denoising the first image, enhancing contrast of the first image; and/or enhancing edges of one or more of the objects in the first image.

At step 504, the method 500 includes converting the second image into grayscale to create a third image.

At step 506, the method 500 includes denoising and smoothing on a pixel-by-pixel basis in the third image to create a fourth image. In some embodiments, this may include replacing each pixel with a median value of a neighboring pixel. After the replacing, salt and pepper noise and gaussian noise may be removed in the third image. Further, smoothing filters may be applied to the third image.

At step 508, the method 500 includes creating a fifth image based on the fourth image by at least adding borders to the objects in the fourth image.

At step 510, the method 500 includes first determining a layering of the objects within the fifth image. Layering identifies which particular objects are in front of or behind other objects.

At step 512, the method 500 includes highlighting the objects in the fifth image to create a sixth image.

At step 514, the method 500 includes generating a graph schema based on the fifth and/or sixth image. The graph schema may represent the objects, relationships between individual ones of the objects, and context of use of the objects. In some embodiments, physical connections between the objects in the fifth image may be determined. Further, a layering of the objects may be determined in the sixth image. Upon determining the layering of the objects, a degree of overlap of the objects may be determined in the sixth image. The graph schema may then be populated with the physical connections between the objects, the layering of the objects, and the degree of overlap of the objects in the fifth image.

In some embodiments, the context of use of the objects is determined by generating a nested relationship model based on the graph schema. The nested relationship model may include information associated with nested relationships between the objects in the sixth image. Further, a nested profiling schema score is determined for the objects based on the nested relationship model. Based on the nested profiling schema score, the context of use of the objects may be determined.

At step 516, the method 500 includes identifying, based on the graph schema, edges of the objects within the sixth image. Further, in an example, noise power spectrum may be applied to the sixth image based on the determining layering of the objects and the determined degree of overlap of the objects. From the results of the applying, the edges of the objects are located within the sixth image. The graph schema may then be populated with the located edges of the objects.

In some embodiments, after the identifying step, image attributes of the objects of the sixth image may be determined based on the graph schema. Further, it is determined if the image attributes satisfy first predefined criteria. In response to a negative result of the determination, one or more of the image attributes of the objects may be modified and returned to the determining step with the sixth image as modified.

At step 518, the method 500 includes ungrouping the sixth image based on the identified edges of the objects. The ungrouping provides an individual vector image for each of the objects.

At step 520, the vector images are recombined into a seventh image operable under modern software, such as CAD. The individual objects can be manipulated, enlarged, removed, etc. within the seventh image as desired.

Implementations of the present disclosure provide technical solutions to multiple technical problems that arise in the context of traditional methods for image conversion. The above methodology provides a technical solution to the technical problems of traditional methods, by both increasing the number of objects in the original raster image that can be located for conversion to vector images and improving the quality of the resulting vector images. The various image processing steps provide a new image with cleaner/clearer versions of the objects along with properties of the individual objects (e.g., which objects connect, the layering of objects, and the degree of overlap of objects), which allows for highly accurate edge detection compared to traditional methods. Objects in the original raster image that traditional methods could not identify can now be identified, and the resulting vector images of the individual objects will be sharper and more accurate than those produced by the traditional methods. The methodology reduces, and potentially eliminates, the traditional method's need for supplemental human recreation by hand.

Further, the vector images generated by the proposed methodology can be re-used for future creation/revision work. Also, the proposed methodology leverage graph-based machine learning along with nested profiling to learn the features and generalize across various raster image types. Therefore, the proposed methodology is not sensitive to noise and hence, the object and edge detection is accurate.

Figure 7:
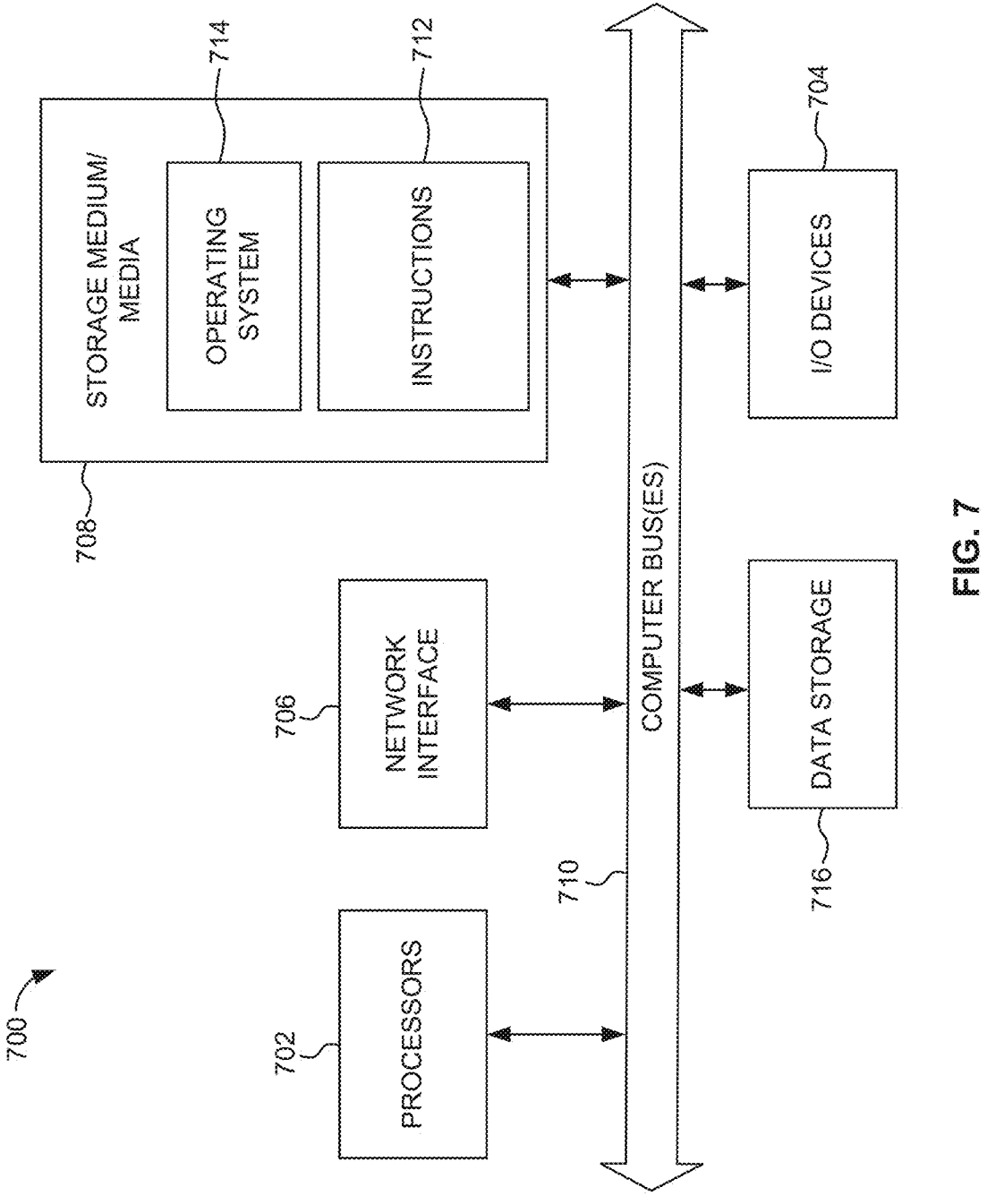
FIG. 7 illustrates a computer system that may be used to implement generation of the vectors images from the raster images in accordance with implementations of the present disclosure.

FIG. 7 illustrates a computer system 700 that may be used to implement the method 500 as described in relation with FIG. 5. More particularly, computing machines such as desktops, laptops, smartphones, tablets, and wearables which may be used to generate vector images from raster images and that may have the structure of the computer system 700. The computer system 700 may include additional components not shown and that some of the process components described may be removed and/or modified. In another example, the computer system 700 may be deployed on external-cloud platforms such as cloud, internal corporate cloud computing clusters, organizational computing resources, and/or the like.

The computer system 700 includes processor(s) 702, such as a central processing unit, ASIC or another type of processing circuit, input/output devices 704, such as a display, mouse keyboard, etc., a network interface 706, such as a Local Area Network (LAN), a wireless 802.11x LAN, a 3G or 4G mobile WAN or a WiMax WAN, and a computer-readable medium 708. Each of these components may be operatively coupled to a bus 710. The computer-readable medium 708 may be any suitable medium that participates in providing instructions programmed to cooperate with the processor(s) 702 to perform the computer-implemented method 500. For example, the computer-readable medium 708 may be non-transitory or non-volatile medium, such as a magnetic disk or solid-state non-volatile memory or volatile medium such as RAM. The instructions or modules stored on the computer-readable medium 708 may include machine-readable instructions 712 executed by the processor(s) 702 that cause the processor(s) 702 to perform the method 500 and functions of the computing system 102.

The method 500 may be implemented as software stored on a non-transitory processor-readable medium and executed by the processors 702. For example, the computer-readable medium 708 may store an operating system 714, such as MAC OS, MS WINDOWS, UNIX, or LINUX, and code for implementation of the method 500. The operating system 714 may be multi-user, multiprocessing, multitasking, multithreading, real-time, and the like. For example, during runtime, the operating system 714 is running and the code for implementation of the method 500 is executed by the processor(s) 702.

The computer system 700 may include a data storage 716, which may include non-volatile data storage. The data storage 716 stores any data used or generated by the method 500.

The network interface 706 connects the computer system 700 to internal systems for example, via a LAN. Also, the network interface 706 may connect the computer system 700 to the Internet. For example, the computer system 700 may connect to web browsers and other external applications and systems via the network interface 706.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term computing system encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random-access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network (LAN) and a wide area network (WAN), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations.

Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for generating vector images of objects within a first image in a raster format, comprising:
    preprocessing the first image to form a second image;
    converting the second image into grayscale to create a third image;
    denoising and smoothing the third image to create a fourth image;
    creating a fifth image based on the fourth image by at least adding borders to the objects in the third image;
    first determining a layering of the objects within the fifth image;
    highlighting the objects in the fifth image to create a sixth image;
    generating a graph schema based on the fifth and/or sixth image, the graph schema representing the objects, relationships between individual ones of the objects, and context of use of the objects;
    identifying, based on the graph schema, edges of the objects within the sixth image;
    ungrouping the sixth image based on the identified edges of the objects; and wherein the ungrouping generates an individual vector image for each of the objects.

2. The computer-implemented method of claim 1, wherein the denoising and smoothing comprises, on a pixel-by-pixel basis in the third image:
    replacing each pixel with a median value of a neighboring pixel;
    removing, after the replacing, salt and pepper noise and gaussian noise in the third image; and
    applying smoothing filters to the third image.

3. The computer-implemented method of claim 1, the generating a graphic schema based on the fifth and/or sixth image further comprises:
    second determining physical connections between the objects in the fifth image;
    third determining a layering of the objects in the sixth image;
    fourth determining a degree of overlap of the objects in the sixth image; and
    populating the graph schema with the physical connections between the objects, the layering of the objects, and the degree of overlap of the objects in the fifth image.

4. The computer-implemented method of claim 3, wherein the identifying edges of the objects within the sixth image further comprises:
    applying noise power spectrum to the sixth image based on the determining layering of the objects and the determined degree of overlap of the objects;
    locating, from the results of the applying, the edges of the objects within the sixth image; and
    populate the graph schema with the located edges of the objects.

5. The computer-implemented method of claim 1, wherein the context of use of the objects is determined by:
    generating a nested relationship model based on the graph schema, wherein the nested relationship model comprises information associated with nested relationships between the objects in the sixth image;
    determining a nested profiling schema score for the objects based on the nested relationship model; and
    determining the context of use of the objects based on the nested profiling schema score.

6. The computer-implemented method of claim 1, wherein the preprocessing comprises any of:
    resizing the first image;
    normalizing the first image;
    denoising the first image;
    enhancing contrast of the first image; and/or
    enhancing edges of at least some of the objects in the first image.

7. The computer-implemented method of claim 1, further comprising after the identifying: fifth determining image attributes of the objects in the sixth image based on the graph schema;
    sixth determining if the image attributes satisfy first predefined criteria;
    modifying the sixth image, in response to a negative result of the sixth determining, comprising:
    modifying one or more of the image attributes of the objects when the first predefined criteria is not satisfied; and
    returning to the fifth determining with the sixth image as modified.

8. A non-transitory computer readable media storing instructions programmed to cooperate with electronic computer hardware and software to perform operations for generating vector images of objects within a first image in a raster format, the operations comprising:
    preprocessing the first image to form a second image;
    converting the second image into grayscale to create a third image;
    denoising and smoothing the third image to create a fourth image;
    creating a fifth image based on the fourth image by at least adding borders to the objects in the third image;

first determining a layering of the objects within the fifth image;

highlighting the objects in the fifth image to create a sixth image;

generating a graph schema based on the fifth and/or sixth image, the graph schema representing the objects, relationships between individual ones of the objects, and context of use of the objects;

identifying, based on the graph schema and the relationships across the entities, edges of the objects within the sixth image;

ungrouping the sixth image based on the identified edges of the objects; and wherein the ungrouping generates an individual vector image for each of the objects.

9. The non-transitory computer readable media of claim 8, wherein the denoising and smoothing comprises, on a pixel-by-pixel basis in the third image:

replacing each pixel with a median value of a neighboring pixel;

removing, after the replacing, salt and pepper noise and gaussian noise in the third image; and applying smoothing filters to the third image.

10. The non-transitory computer readable media of claim 8, the generating a graphic schema based on the fifth and/or sixth image further comprises:

second determining physical connections between the objects in the fifth image;

third determining a layering of the objects in the sixth image;

fourth determining a degree of overlap of the objects in the sixth image; and populating the graph schema with the physical connections between the objects, the layering of the objects, and the degree of overlap of the objects in the fifth image.

11. The non-transitory computer readable media of claim 10, wherein the identifying edges of the objects within the sixth image further comprises:

applying noise power spectrum to the sixth image based on the determining layering of the objects and the determined degree of overlap of the objects;

locating, from the results of the applying, the edges of the objects within the sixth image; and populate the graph schema with the located edges of the objects.

12. The non-transitory computer readable media of claim 8, wherein the context of use of the objects is determined by:

generating a nested relationship model based on the graph schema, wherein the nested relationship model comprises information associated with nested relationship between the objects in the sixth image;

determining a nested profiling schema score for the objects based on the nested relationship model; and determining the context of use of the objects based on the nested profiling schema score.

13. The non-transitory computer readable media of claim 8, wherein the preprocessing comprises any of:

resizing the first image;

normalizing the first image;

denoising the first image;

enhancing contrast of the first image; and/or enhancing edges of at least some of the objects in the first image.

14. The non-transitory computer readable media of claim 8, the operations further comprising after the identifying:

fifth determining image attributes of the objects of the sixth image based on the graph schema;

sixth determining if the image attributes satisfy first predefined criteria;

modifying the sixth image, in response to a negative result of the sixth determining, comprising:

modifying one or more of the image attributes of the objects when the first predefined criteria is not satisfied; and returning to the fifth determining with the sixth image as modified.

15. A system, comprising:

a processor;

a non-transitory computer readable media storing instructions programmed to cooperate with the processor to perform operations for generating vector images of objects within a first image in a raster format, the operations comprising:

preprocessing the first image to form a second image;

converting the second image into grayscale to create a third image;

denoising and smoothing the third image to create a fourth image;

creating a fifth image based on the fourth image by at least adding borders to the objects in the third image;

first determining a layering of the objects within the fifth image;

highlighting the objects in the fifth image to create a sixth image;

generating a graph schema based on the fifth and/or sixth image, the graph schema representing the objects, relationships between individual ones of the objects, and context of use of the objects;

identifying, based on the graph schema, edges of the objects within the sixth image;

ungrouping the sixth image based on the identified edges of the objects; and wherein the ungrouping generates an individual vector image for each of the objects.

16. The system of claim 15, wherein the denoising and smoothing comprises, on a pixel-by-pixel basis in the third image:

replacing each pixel with a median value of a neighboring pixel;

removing, after the replacing, salt and pepper noise and gaussian noise in the third image; and applying smoothing filters to the third image.

17. The system of claim 15, the generating a graphic schema based on the fifth and/or sixth image further comprises:

second determining physical connections between the objects in the fifth image;

third determining a layering of the objects in the sixth image;

fourth determining a degree of overlap of the objects in the sixth image; and populating the graph schema with the physical connections between the objects, the layering of the objects, and the degree of overlap of the objects in the fifth image.

18. The system of claim 17, wherein the identifying edges of the objects within the sixth image further comprises:

applying noise power spectrum to the sixth image based on the determining layering of the objects and the determined degree of overlap of the objects;

locating, from the results of the applying, the edges of the objects within the sixth image; and populate the graph schema with the located edges of the objects.

19. The system of claim 15, wherein the context of use of the objects is determined by:

generating a nested relationship model based on the graph schema, wherein the nested relationship model comprises information associated with nested relationship between the objects in the sixth image;

determining a nested profiling schema score for the objects based on the nested relationship model; and determining the context of use of the objects based on the nested profiling schema score.

20. The system of claim 15, wherein the preprocessing comprises any of:

resizing the first image;

normalizing the first image;

denoising the first image;

enhancing contrast of the first image; and/or enhancing edges of at least some of the objects in the first image.

* * * * *